US010298865B2

(12) United States Patent
Shirai

(10) Patent No.: US 10,298,865 B2
(45) Date of Patent: May 21, 2019

(54) IMAGE PROCESSING APPARATUS, IMAGE CAPTURING APPARATUS, METHOD FOR CONTROLLING IMAGE PROCESSING APPARATUS, AND NON-TRANSITORY COMPUTER-READABLE STORAGE MEDIUM FOR CORRECTING IMAGE CORRESPONDING TO CHANGE IN STATE OF AN OPTICAL MEMBER

(71) Applicant: CANON KABUSHIKI KAISHA, Tokyo (JP)

(72) Inventor: Kunihiro Shirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/834,474

(22) Filed: Dec. 7, 2017

(65) Prior Publication Data
US 2018/0167568 A1 Jun. 14, 2018

(30) Foreign Application Priority Data
Dec. 12, 2016 (JP) .................................. 2016-240565

(51) Int. Cl.
| G03B 17/14 | (2006.01) |
| G03B 7/091 | (2006.01) |
| H04N 5/217 | (2011.01) |
| H04N 5/232 | (2006.01) |
| H04N 5/357 | (2011.01) |

(52) U.S. Cl.
CPC ........... *H04N 5/3572* (2013.01); *G03B 7/091* (2013.01); *G03B 17/14* (2013.01); *H04N 5/2176* (2013.01); *H04N 5/23293* (2013.01)

(58) Field of Classification Search
CPC ........ G03B 17/14; G03B 7/091; H04N 5/217; H04N 5/2176; H04N 5/243; H04N 5/357; H04N 5/3572
See application file for complete search history.

(56) References Cited

U.S. PATENT DOCUMENTS

2008/0291299 A1* 11/2008 Kano ................. H04N 5/23258
348/241
2009/0147110 A1* 6/2009 Muramatsu .......... H04N 5/3572
348/255

(Continued)

FOREIGN PATENT DOCUMENTS

| JP | 2003-110936 A | 4/2003 |
| JP | 2008-096907 A | 4/2008 |
| JP | 2011-135569 A | 7/2011 |

*Primary Examiner* — Amy R Hsu
(74) *Attorney, Agent, or Firm* — Cowan, Liebowitz & Latman, P.C.

(57) ABSTRACT

An image processing apparatus comprising, a circuitry configured to perform operations of, setting a target value in a case of correcting degradation in image quality of an image caused by an optical member, based on a characteristic of the optical member, the image being generated by an image sensor by photoelectrically converting an optical image of a subject that has passed through the optical member, acquiring information regarding a state of the optical member, setting first correction values for correcting the degradation in image quality of the image caused by the optical member, based on the target value and the information regarding the state, and correcting the image based on the first correction values.

20 Claims, 11 Drawing Sheets

(56) References Cited

U.S. PATENT DOCUMENTS

| | | | | |
|---|---|---|---|---|
| 2010/0066868 A1* | 3/2010 | Shohara | .................. | G06K 9/40 |
| | | | | 348/241 |
| 2012/0305748 A1* | 12/2012 | Spears | ................. | H04N 5/3532 |
| | | | | 250/208.1 |
| 2014/0071336 A1* | 3/2014 | Takanashi | .......... | H04N 5/23209 |
| | | | | 348/360 |

* cited by examiner

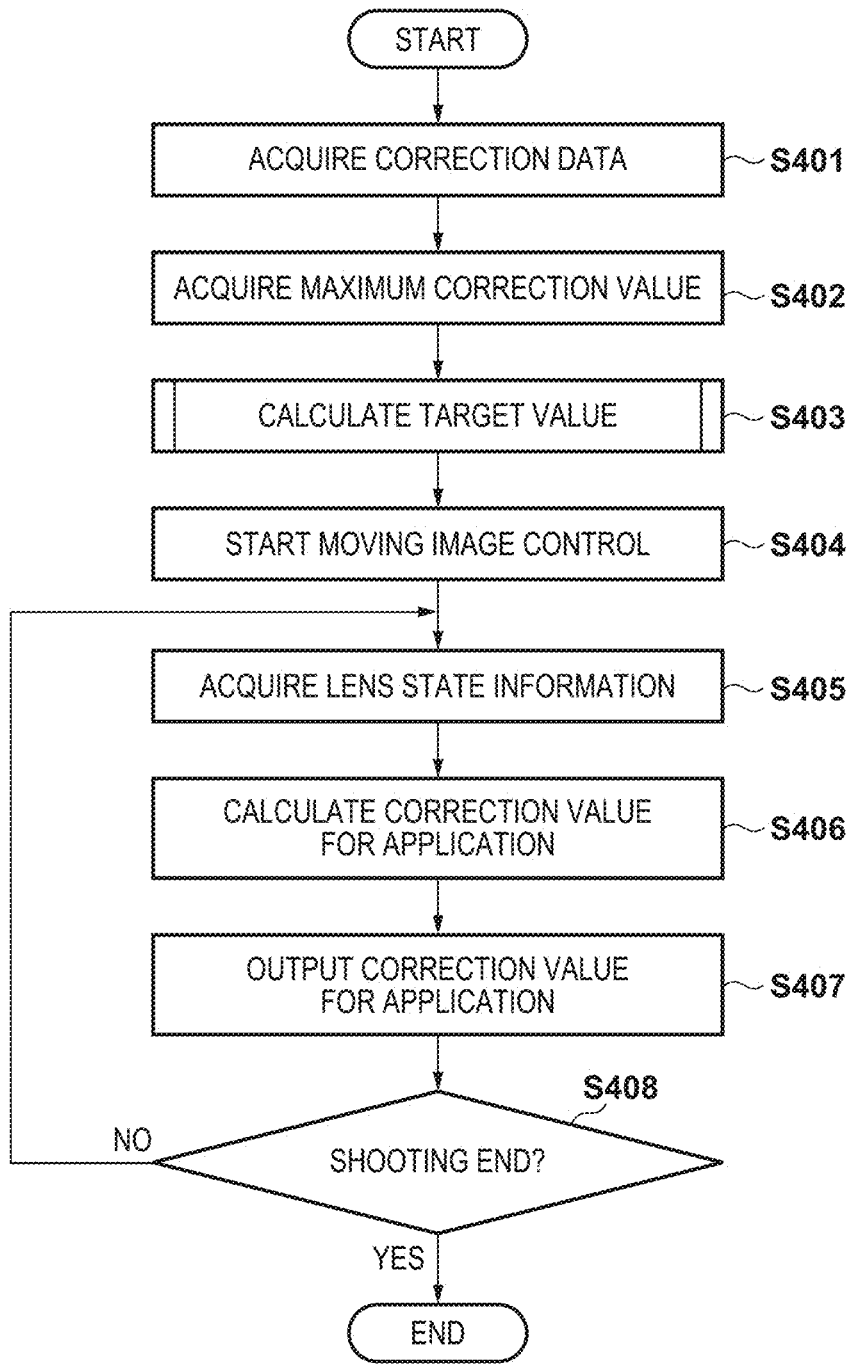

IMAGE PROCESSING APPARATUS, IMAGE CAPTURING APPARATUS, METHOD FOR CONTROLLING IMAGE PROCESSING APPARATUS, AND NON-TRANSITORY COMPUTER-READABLE STORAGE MEDIUM FOR CORRECTING IMAGE CORRESPONDING TO CHANGE IN STATE OF AN OPTICAL MEMBER

BACKGROUND OF THE INVENTION

Field of the Invention

The invention relates to an image processing apparatus, an image capturing apparatus, a method for controlling the image processing apparatus, and a non-transitory computer-readable storage medium.

Description of the Related Art

A lens unit for forming a subject image on an image sensor includes various factors that cause degradation in the image quality such as distortion and light fall off at edges in the subject image. For example, when light passes through a lens unit, it is ideal if the subject image and the image formed by the lens are analogous, but due to a phenomenon called "distortion aberration" in which the image is distorted at the periphery, a straight line is shown distorted, departing from this ideal. In addition, a phenomenon called "light fall off at edges", in which the light amount is lower toward the edges of the image than in the center of the image, is caused by so-called vignetting, which is caused by reduction of a portion of peripheral light caused by the barrel of the lens unit, or by the cosine fourth law or the like.

Japanese Patent Laid-Open No. 2003-110936 discloses correction processing that is applied to such a phenomenon that causes degradation in image quality. In this correction processing, correction data for light fall off at edges that corresponds to apertures, focal lengths or focal positions of a lens unit is recorded in a memory. Signal processing for correcting an image is then performed according to the actual aperture value, focal length, or focal position of the lens unit.

Besides digital cameras, this correction processing is also applied in digital video camcorders, cameras that nave a so-called live view (LV) function for real-time display of images received by the image sensor, and the like. In this case, degradation in image quality in a moving image that is caused by the lens unit is corrected in real time according to the optical state of the lens unit.

Japanese Patent Laid-Open No. 2008-096907 discloses this real-time correction processing. Here, first, correction values for aberration, a peripheral light amount and the like are stored in a memory inside an interchangeable lens unit. Information regarding the correction values is provided from, the memory inside the interchangeable lens unit to the image capturing apparatus when the image capturing apparatus is powered on, or the interchangeable lens unit is connected to the image capturing apparatus. While receiving information regarding the optical state in real time, the image capturing apparatus performs image correction corresponding to the optical state of the interchangeable lens unit using the correction values received in advance.

When correction that is based on correction values stored in advance is performed in this manner while shooting a moving image or executing an LV function, the correction result is affected by the resolution of the correction data, the sampling interval and the like during communication of information regarding the state of the lens unit between the lens unit and the image capturing apparatus. For example, if the sampling interval in communication is large or the resolution of correction data is low, it is conceivable that the degree of continuity of the correction values becomes low, correction that is discrete on the time axis is applied, and the quality of the moving image becomes degraded. For this issue, Japanese Patent Laid-Open No. 2011-135569 discloses a technique in which a certain time constant (change rate) is provided so as to gradually change the correction value instead of performing real time correction that is based on values from the lens unit.

However, if the communication sampling interval of the lens unit or the resolution of the correction data is not sufficient, and furthermore, the change amount of the lens unit changes rapidly, it takes longer to reach a desired correction value if time constant processing is applied to a moving image or a LV function. Also, there is a high possibility that an unnatural image will be acquired as a correction result since the correction value during this time is not appropriate. On the other hand, if the interval of the time constant is set short, change in the correction value becomes steep, which is perceived as flickering on the time axis in an image acquired as a correction result. As an example in which an unnatural image is acquired by performing time constant processing, there are cases where a lens unit changes from a state where light fall off at edges is large to a state where light fall off at edges is small. In this case, although light fall off at edges is small, a correction value corresponding to the case where light fall off at edges is large is applied for a certain period. Therefore, excessive correction is performed until the time constant processing is complete, and an image whose periphery is unnaturally bright is output.

SUMMARY OF THE INVENTION

The invention can provide a correction processing technique that makes it possible to output an appropriately corrected image regardless of change in the state of a lens unit.

One aspect of embodiments of the invention relates to an image processing apparatus comprising, a circuitry configured to perform operations of setting a target value in a case of correcting degradation in image quality of an image caused by an optical member, based on a characteristic of the optical member, the image being generated by an image sensor by photoelectrically converting an optical image of a subject that has passed through the optical member, acquiring information regarding a state of the optical member, setting first correction values for correcting the degradation in image quality of the image caused by the optical member, based on the target value and the information regarding the state, and correcting the image based on the first correction values.

Further features of the invention will become apparent from the following description of exemplary embodiments (with reference to the attached drawings).

BRIEF DESCRIPTION OF THE DRAWINGS

FIG. 4 is a flowchart showing an example of correction processing according to the embodiments of the invention.

DESCRIPTION OF THE EMBODIMENTS

Embodiments of the invention will be described below in detail with reference to the drawings.

First Embodiment

Figure 1:
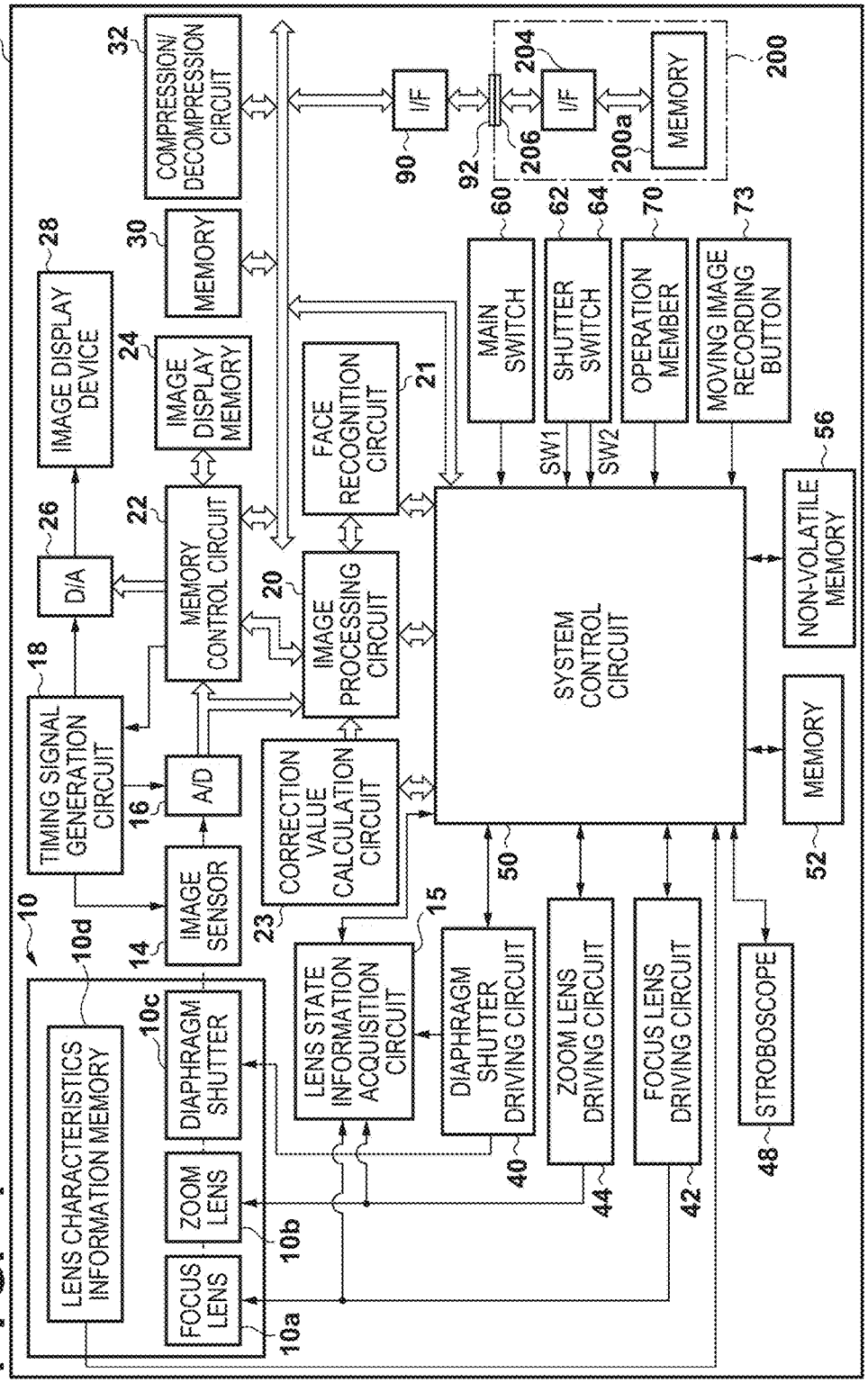
FIG. 1 is a block diagram showing an example of the configuration of an image capturing apparatus according to embodiments of the invention.

A first embodiment of the invention will be described below with focus on a case where a peripheral light amount is corrected. FIG. 1 is a block diagram showing an example of the configuration of an image capturing apparatus 100 according to the embodiments of the invention. The image capturing apparatus 100 can be realized as a digital camera or a digital video camera, for example. In addition to these, the image capturing apparatus 100 can also be realized as any information processing terminal or image capturing apparatus that has an imaging function such as a personal computer, a mobile phone, a smartphone, a PDA, a tablet terminal and a mobile media player, for example. Note that FIG. 1 shows a configuration including a lens unit 10 that is an optical member, in consideration of a case where the image capturing apparatus 100 functions as a digital camera or the like. However, if the image capturing apparatus 100 is configured such that an interchangeable lens can be mounted like a single-lens reflex digital camera as an embodiment of the invention, the interchangeable lens is equivalent to the lens unit 10. In this case, the lens unit 10 is excluded as a constituent element of the image capturing apparatus 100.

The configuration and operations of the image capturing apparatus 100 of this embodiment will be described with reference to FIG. 1. The image capturing apparatus 100 has a focus lens 10a, a zoom lens 10b, a diaphragm shutter 10c and a lens characteristics information memory 10d, as the lens unit 10 that is an optical member. Information such as a lens ID, an aperture, a focal length and a focal position of the lens is recorded in the lens characteristics information memory 10d. Lens characteristics information that is recorded in the lens characteristics information memory 10d includes data for correcting, by performing signal processing, various types of degradation or deterioration in image quality (hereinafter, simply referred to as "degradation in image quality") caused by the lens unit 10, such as light fall off at edges, chromatic aberration, shading, spherical aberration, and distortion aberration. This data includes discrete values for performing correction corresponding to the state of constituent elements of the lens unit 10. The state of the constituent elements in the lens unit 10 is acquired by a lens state information acquisition circuit 15, and a correction value calculation circuit 23 calculates a correction value that is used in an image processing circuit 20, using data corresponding to a specified state.

An optical image that has been reflected from the subject and has passed through the focus lens 10a and the zoom lens 10b is incident on an image sensor 14 when the diaphragm shutter 10c is opened. The image sensor (an imaging unit) 14 is configured as a CMOS image sensor, for example, photoelectrically converts an incident optical image, and outputs analog image signals. An A/D converter 16 converts the analog image signals that have been output from the image sensor 14 into digital image signals (image data).

A timing signal generation circuit 18 supplies a clock signal, a control signal and the like to the image sensor 14, the A/D converter 16, and a D/A converter 26 under control of a memory control circuit 22 and a system control circuit 50. The image processing circuit 20 performs predetermined image processing such as pixel interpolation processing and color conversion processing on the image data from the A/D converter 16 or image data from the memory control circuit 22. The image processing circuit 20 also performs predetermined calculation processing using the image data that has been output from the A/D converter 16. Based on this calculation result, the system control circuit 50 performs TTL (through-the-lens) auto exposure control processing and autofocus processing for controlling a diaphragm shutter driving circuit 40 and a focus lens driving circuit 42, and automatic light emission control processing of a stroboscope 48. Furthermore, the image processing circuit 20 performs predetermined calculation processing using the image data that has been output from the A/D converter 16, and also performs TTL auto white balance processing based on this calculation result.

A face recognition circuit 21 recognizes (detects) an image of a person, or particularly a face from within a subject image, and notifies the system control circuit 50 of the detection result. The system control circuit 50 controls the focus lens driving circuit 42 in order to put the face portion in focus according to the face detection result of the face recognition circuit 21, and adjusts the light amount of the stroboscope 48. The system control circuit 50 also causes the image processing circuit 20 to perform auto white balance processing according to the face detection result of the face recognition circuit 21.

The memory control circuit 22 controls the A/D converter 16, the timing signal generation circuit 18, the image processing circuit 20, an image display memory 24, the D/A converter 26, a memory 30, and a compression/decompression circuit 32. Image data that has been output from the A/D converter 16 is written in the image display memory 24 or the memory 30 via the image processing circuit 20 and the memory control circuit 22, or via only the memory control circuit 22. The memory 30 is used as a frame buffer for images that are to be continuously written into a memory 200a of a recording medium 200 at a predetermined rate at the time of moving image shooting. The memory 30 is also used as a work area of the system control circuit 50. The compression/decompression circuit 32 reads an image stored in the memory 30, performs compression processing or expansion processing, and writes data after the processing back in the memory 30.

The diaphragm shutter driving circuit 40 drives the diaphragm shutter 10c based on a calculation result of the image processing circuit 20 so as to control the aperture and the shutter speed. The focus lens driving circuit 42 drives the focus lens 10a based on a calculation result of the image processing circuit 20 so as to perform autofocus control. A zoom lens driving circuit 44 drives the zoom lens 10b according to a magnification operation performed by an operation member 70. The stroboscope 48 has a function for projecting autofocus auxiliary light and a function for controlling stroboscope light. Control information for these functions is also provided to the lens state information acquisition circuit 15 in order for the lens state information acquisition circuit 15 to detect the state of the lens unit 10.

The system control circuit 50 includes a CPU and a memory (not illustrated), and controls overall operations of the image capturing apparatus 100. A memory 52 stores constants, variables, and computer programs (basic programs) for operating the system control circuit 50, and the like. A non-volatile memory 56 is constituted by an EEPROM capable of electrically erasing and recording data, for example, and is used as a memory for storing computer programs and the like. The computer programs stored in the non-volatile memory 56 include an application program for causing the system control circuit 50 to control execution of peripheral light amount correction processing, which will be described later with reference to FIG. 4. The non-volatile memory 56 also stores setting values that have been set on a menu screen, a GUI screen such as an exposure correction/AEB setting screen, and the like.

A main switch 60 is a switch for switching on and off the power supply of the image capturing apparatus 100. At the same time, on and off of the power supply of the recording medium 200 connected to the image capturing apparatus 100 can also be switched by operating the main switch 60. A shutter switch (SW1) 62 is turned on by performing a first stroke operation (half-pressing) on a release button, and instructs the system control circuit 50 to start operations of autofocus processing, auto exposure control processing and the like. A shutter switch (SW2) 64 is turned on by performing a second stroke operation (full pressing) on the release button, and instructs the system control circuit 50 to start operations of a series of image capturing processing consisting of exposure processing, developing processing and recording processing.

The operation member 70 has various buttons, switches, a touch panel and the like (not illustrated). The buttons include a menu button, a set button, a menu move button, and a compression mode switch, for example. The system control circuit 50 performs various operations according to signals from the operation member 70. Note that the compression mode switch is a switch for selecting a compression rate of JPEG compression, or selecting a RAW mode for digitizing signals of the image sensor 14 without any change and recording the signals as RAW image data in the recording medium of the recording medium 200.

For example, a normal mode and a fine mode are prepared as JPEG compression modes, and it is sufficient that if importance is placed on the data size of an image that has been shot, the normal mode is selected, and if importance is placed on the image quality of an image that has been shot, the fine mode is selected. In the JPEG compression modes, image data that has been read out from the image sensor 14 and written in the memory 30 via the A/D converter 16, the image processing circuit 20, and the memory control circuit 22 is read out. This image data is compressed by the compression/decompression circuit 32 at a compression rate related to the settings, and is recorded in the recording medium of the recording medium 200.

In the RAW mode, image data is read out for each line according to the pixel array of the Bayer array color filter of the image sensor 14, and RAW image data written in the memory 30 is read out via the A/D converter 16 and the memory control circuit 22, and is recorded in the memory 200a of the recording medium 200. A moving image recording button 73 is operated in order to instruct an operation of recording, in the memory 30 and the recording medium of the recording medium 200, moving image data that has been shot.

An I/F 90 is an interface by which the image capturing apparatus 100 communicates with the recording medium 200, and a connector 92 is a connection portion for connecting the recording medium 200 to the image capturing apparatus 100. The recording medium 200 has an I/F 204 and the memory 200a, and is detachably connected to the image capturing apparatus 100 via a connector 206. Moving image data and still image data that have been shot by the image capturing apparatus 100 are recorded and saved in the memory 200a. When recording and saving the moving image data and still image data in the memory 200a of the recording medium 200, image correction corresponding to this embodiment can be performed in order to suppress degradation in image quality caused by the lens unit 10.

An electronic viewfinder (EVF) function, which is a so-called live view (LV) function, is realized by an image display device 28 displaying image data that is written in the image display memory 24, and that has been sequentially converted into analog signals by the D/A converter 26. Note that the image display device 28 turns on/off the electronic viewfinder (EVF) function according to an instruction from the system control circuit 50. In the above-described live view (LV) function, it is possible to perform image correction for suppressing degradation in image quality caused by the lens unit 10.

In this image correction, when power is supplied, or an interchangeable lens (the lens unit 10) is connected, the system control circuit 50 reads out characteristics information regarding the lens unit 10 from the lens characteristics information memory 10d. As described above, this lens characteristics information includes characteristics information such as the lens ID, the open aperture value and the focal lengths at the telephoto end and the wide end of the lens unit 10.

The lens state information acquisition circuit 15 acquires information regarding the current state of the lens unit 10 at a predetermined timing, for example, for each frame. Specifically, the lens state information acquisition circuit 15 acquires the current aperture value from the diaphragm, shutter driving circuit 40, the current focal length (a zoom position) from the zoom lens driving circuit 44, and the current focal position from the focus lens driving circuit 42, as lens state information. Note that lens state information other than the above that is necessary for image correction can also be acquired as appropriate.

The system control circuit 50 notifies the correction value calculation circuit 23 of the lens characteristics information acquired from the lens characteristics information memory 10d and the lens state information acquired from the lens state information acquisition circuit 15. For example, the correction value calculation circuit 23 calculates the various correction values such as a correction coefficient for correcting light fall off at edges of the lens unit 10, a correction coefficient for correcting distortion, and a correction coefficient for correcting chromatic aberration based on the notified lens characteristics information and lens state information. The correction value here may be calculated based on a correction value calculated from the lens state information and the lens characteristics information and recorded in advance, or an approximated value that is acquired by a general optical formula based on the lens state information and the lens characteristics information may be used.

The system control circuit 50 notifies the image processing circuit 20 of the correction value calculated by the correction value calculation circuit 23. The image processing circuit 20 corrects image degradation caused by the lens unit 10, based on the notified correction value. Basically, it is desirable that deterioration of the lens unit 10 is completely corrected in image deterioration correction at this time. However, there are cases where excessive correction occurs due to the influence of a manufacturing error of the lens unit, the noise resistance of the image sensor 14, the resolution of the correction data, an interpolation error caused thereby, and the like. This excessive correction can be solved by moderating the correction intensity, and processing in that case will be described with reference to FIGS. 2A to 2D.

Figure 2A:
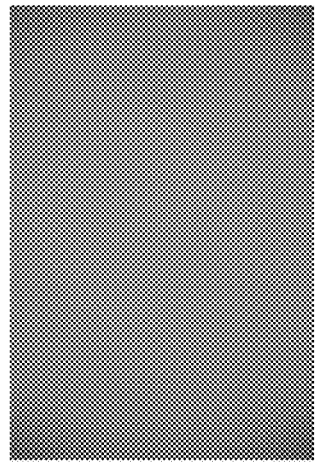
FIGS. 2A to 2D are diagrams for illustrating the concept of correction of light fall off at edges.
Figure 2B:
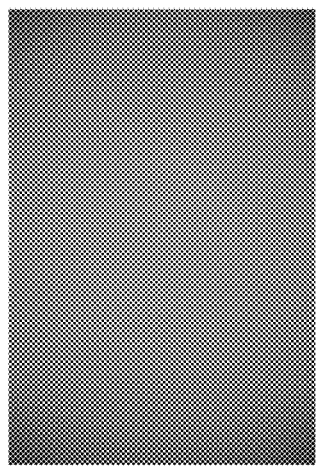
Figure 2C:
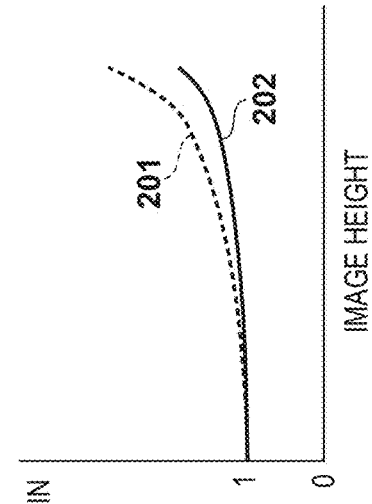

FIGS. 2A to 2D are diagrams for illustrating the concept of correction of light fall off at edges. FIGS. 2A and 2B show an image captured by the image capturing apparatus 100 when the lens unit 10 is in a certain lens state, the image being an example of an image in which light fall off at edges has occurred. Here, the light amount decreases from the center of the screen toward the four corners. FIG. 2C shows an example of an image characteristics value of an image in which light fall off at edges has occurred as shown in FIG. 2A. The horizontal axis indicates the distance (image height) from the image center (optical axis), and the vertical axis indicates a standardized light amount value at each image height when the light amount at the center is assumed to be 1. As described above, light fall off at edges refers to a property of decrease in the light amount at a periphery of an image at which the image height is larger.

Figure 2D:
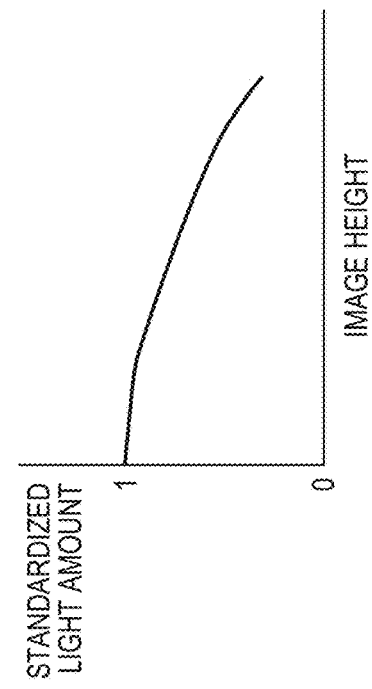

FIG. 2D is a graph showing an example of a peripheral light amount correction value generated in the correction value calculation circuit 23. In FIG. 2D, a correction value for completely correcting an image in which light fall off at edges has occurred as shown in FIG. 2C is indicated by a broken line 201. In this embodiment, a correction value is used such that a standardized light amount at a predetermined image height is multiplied by the correction value, and thus the correction value itself represents the rate of input to output, namely, a gain. Therefore, a correction value may be referred to as a "correction gain", or may be simply referred to as a "gain". Moreover, in this embodiment, completely correcting an image means correcting the image such that the standardized light amount is 1 at all image heights, and a correction value for completely correcting an image in this manner is referred to as an "ideal correction value". It is desirable to apply this ideal correction value 201 indicated by a broken line when correcting light fall off at edges. However, the ideal correction value 201 cannot be applied as-is in consideration of a case where there is a risk that applying the ideal correction value 201 causes excessive correction due to the influence of a manufacturing error, the noise resistance of the image sensor 14 and the like as described above.

For example, if a noise component is included in output signals of the image sensor 14, amplifying pixel values using the correction value 201 in later-stage image processing naturally results in amplifying the noise component as well. In this case, even if an image in which light fall off at edges has occurred is corrected, it is possible that the image quality degrades due to the noise component being emphasized if the correction value is too large. Accordingly, in peripheral light amount correction in an image capturing system in which the image sensor 14 is used, there is a restriction that is based on the characteristics of the image sensor 14. In view of this, in this embodiment, the ideal correction value 201 indicated by the broken line in FIG. 2D is moderated to be a correction value 202 as indicated by a solid line as a correction value that does not cause excessive correction, and peripheral light amount correction is performed using the correction value 202. In this embodiment, this correction value 202 is referred to as a "correction value for application", and can be generated from the ideal correction value 201. At this time, it is possible to use the maximum correction value (allowable maximum gain) that is based on the characteristics of the image sensor 14.

Here, an example of a method for generating the correction value 202 will be described. First, the correction value calculation circuit 23 extracts the maximum value of the calculated correction value 201. The maximum value of the correction value 201 will be a value for correcting an image in which the degree of degradation in image quality caused by the lens unit 10 is a maximum. For example, in the case of FIG. 2C, the standardized light amount is minimum at the maximum value of the image height, and a correction value for changing this value to 1 is the maximum value of the correction value 201. Next, the allowable maximum gain of the image sensor 14 recorded in advance in the non-volatile memory 56 is acquired via the system control circuit 50, the calculated correction value is moderated below the allowable maximum gain, and other values are corrected accordingly as appropriate, as a method for correcting a correction value. The method for correcting a correction value is not limited to this, and any other method may be used.

When an image that is generated is a still image that is not affected by temporal continuity, if there is optimum correction for each instance of shooting, in other words if the above-described restriction exists in each instance of shooting, it is sufficient that a value for performing maximum correction under each shooting condition is calculated and applied. At this time, it suffices for the correction value calculation circuit 23 to perform processing for lowering the maximum value of a calculated peripheral light amount correction value below the above-described maximum allowable gain every time shooting is performed. However, if an image that is generated is a moving image, or shooting is performed using a LV function, there is a high possibility that the image becomes unnatural in quality in the correction result if processed similarly to a still image. This problem will be described in detail with reference to FIGS. 3A to 3J.

Figure 3A:
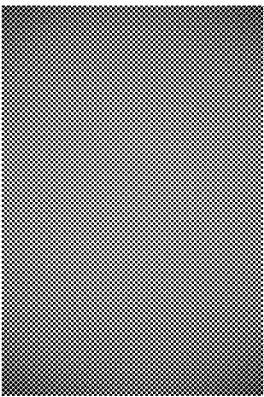
FIGS. 3A to 3J are diagrams for illustrating an issue related to correction of light fall off at edges.
Figure 3B:
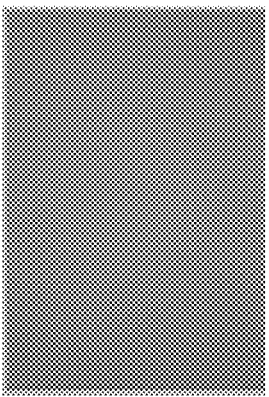
Figure 3C:
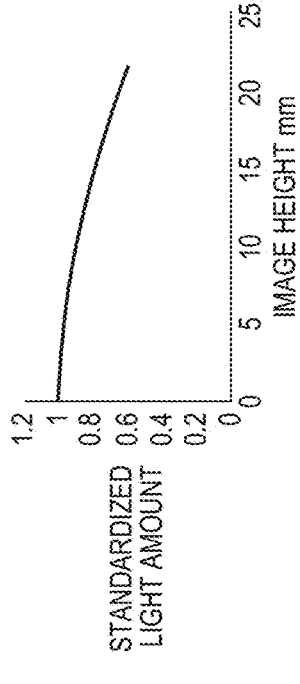
Figure 3D:
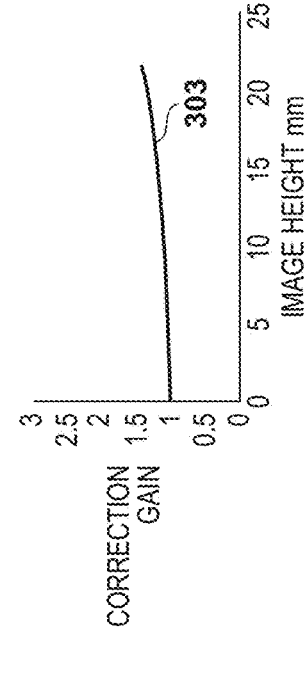
Figure 3E:
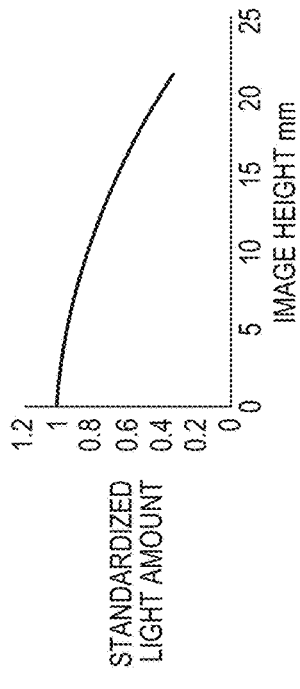
Figure 3F:
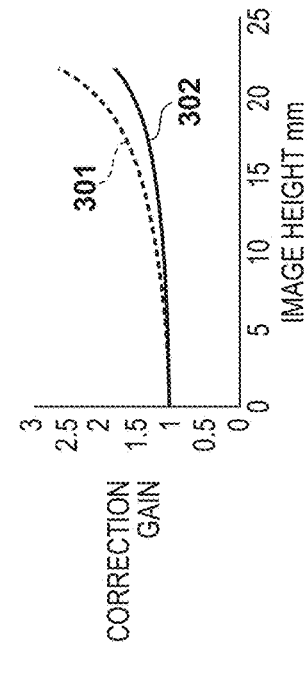

Here, a case where the characteristics of the lens unit 10 changed from a state A to a state B during moving image shooting and execution of a LV function due to auto exposure control, a user operation, or the like will be described as an example. FIG. 3A is an example of an image that exhibits light fall off at edges characteristics of the state A, and FIG. 3B is an example of an image that exhibits light fall off at edges characteristics of the state B. As seen by comparing the images, the state changed such that the amount of light fall off at edges decreased from the state A to the state B. FIG. 3C shows an example of an image characteristics value of an image in which light fall off at edges of the state A as in FIG. 3A has occurred. FIG. 3D shows an example of an image characteristics value of an image in which light fall off at edges of the state B as in FIG. 3B has occurred. The correction value calculation circuit 23 calculates a correction value for each of the states.

Figure 3G:
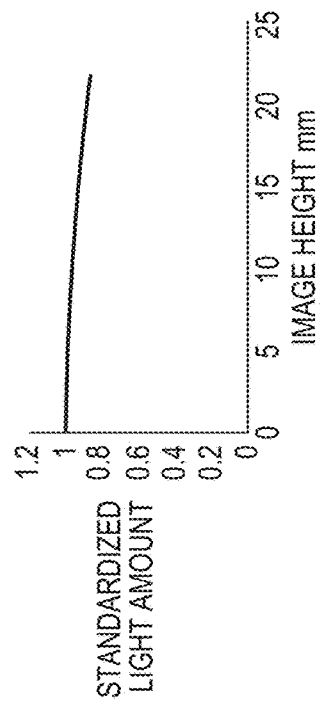

In the case of the state A, basically, an ideal correction value (a correction value indicated by a broken line 301 in FIG. 3E) is desired to be used, but under the above-described system restriction due to the degree of light fall off at edges being large, a correction value (a gain 302 indicated by a solid line in FIG. 3E) acquired by reducing a correction amount will be applied. As a result, the image characteristics value of an image in which light fall off at edges of the state A has occurred and that has been corrected, is as shown in FIG. 3G. In this case, even after the correction, the light fall off at edges remains to some degree.

On the other hand, in the case of the state B, due to the degree of light fall off at edges being originally small, an ideal correction value (FIG. 3F) can be applied without the above-described system restriction. Accordingly, the image characteristics value of the image in which light fall off at edges of the state B has occurred and that has been corrected, makes it possible to realize a state where there is substantially no light fall off at edges as shown in FIG. 3H.

Figure 3I:
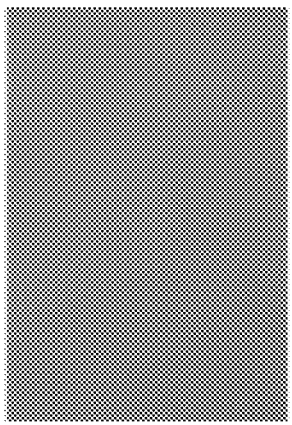
Figure 3H:
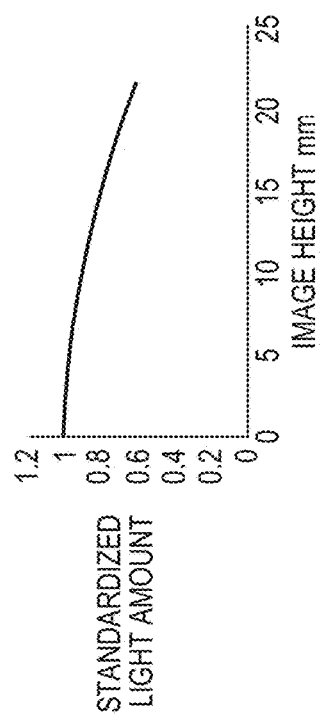
Figure 3J:
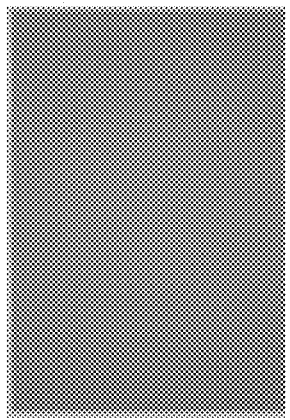

As a result of the above correction, the state in FIG. 3I is entered by correcting the image in which the light fall off at edges of the state A has occurred, and the state in FIG. 3J is entered by correcting the image in which the light fall off at edges of the state B has occurred. In the case of a still image, which is an independent image, it is sufficient that processing suitable for the individual image is performed, and thus there is no problem with this result. However, regarding the image quality in a case of a moving image that has been shot and an LV function, the image in FIG. 3J will be displayed after the image in FIG. 3I, and thus there is a possibility that the user will be given the impression that the periphery of the screen suddenly became brighter. Flickering can be reduced by applying time constant processing described in Japanese Patent Laid-Open No. 2011-135569 as a method for avoiding this state. However, in this method, it takes time for the time constant processing to stabilize, and during that time, a correction value for correcting an image in the state A in which light fall off at edges is large is applied to an image in the state B in which light fall off at edges is small. Therefore, the periphery of the image in the state B enters an excessive correction state, and as a result, an unnatural image will be output.

Such a problem becomes significant particularly when change between the state A and the state B is large. For example, when a moving image such as a low speed moving image (so-called time lapse) is generated, the actual time interval between frames of the moving image is long, and thus the state change from the image generated immediately previously is likely to be large. Processing in this embodiment for solving such a problem will be described with reference to flowcharts in FIGS. 4 and 5.

Figure 5:
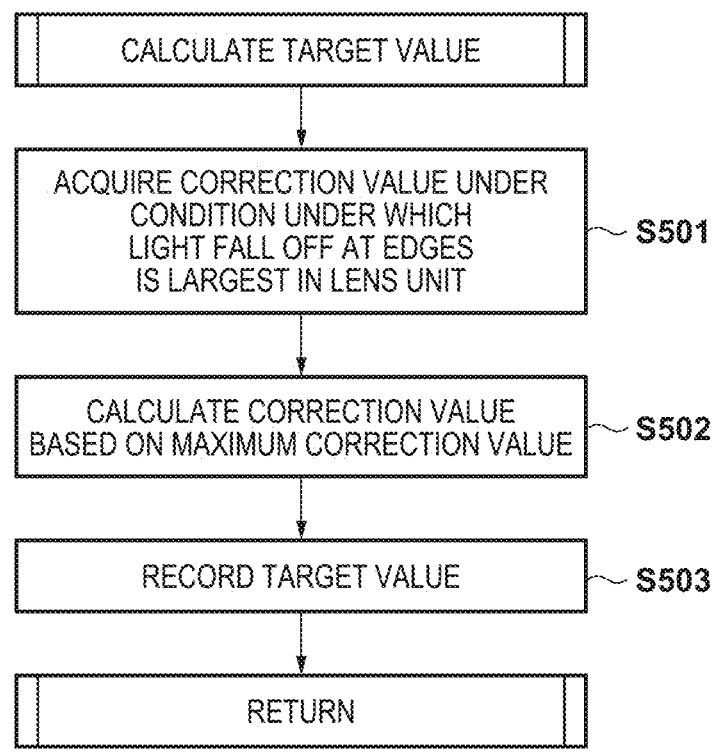
FIG. 5 is a flowchart showing an example of processing for calculating a target value according to a first embodiment of the invention.

FIGS. 4 and 5 are flowcharts showing an example of processing executed by the correction value calculation circuit 23. For example, the processing corresponding to the flowcharts can be realized by corresponding programs (stored in a ROM or the like) being executed by one or more processors that function as the correction value calculation circuit 23.

In step S401, the correction value calculation circuit 23 acquires correction data of the lens unit 10 that is mounted. If the correction data is recorded in the non-volatile memory 56 of the image capturing apparatus 100, the correction value calculation circuit 23 can acquire the correction data.

In addition, if the lens unit 10 is an interchangeable lens, correction data held by the lens characteristics information memory 10d of the lens unit 10 may be acquired via the system control circuit 50. The correction data may be acquired by the system control circuit 50, and be provided to the correction value calculation circuit 23, when the interchangeable lens is mounted to the image capturing apparatus 100.

Next, in step S402, the correction value calculation circuit 23 acquires the allowable maximum gain that is the maximum correction value under system restriction, and that is recorded in the non-volatile memory 56 in the image capturing apparatus 100. It is possible to determine the allowable maximum gain by measuring the characteristics of the image sensor 14 in advance, for example, and record the value in the non-volatile memory 56.

Next, in step S403, the correction value calculation circuit 23 calculates a target value for peripheral light amount correction based on the information acquired in steps S401 and S402 (step S103). This calculation procedure is shown in detail in the flowchart in FIG. 5. Processing for calculating the target value will be described below in detail with reference to FIG. 5.

Figure 6A:
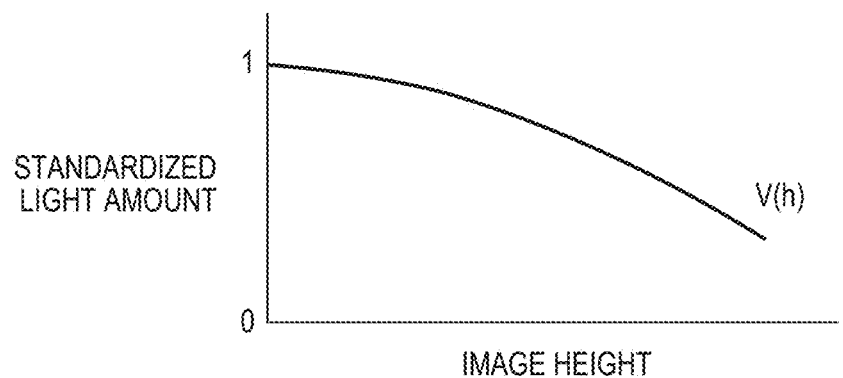
FIGS. 6A to 6C are diagrams for illustrating an example of a method for calculating a target value according to the first embodiment of the invention.

First, in the following procedure, the correction value calculation circuit 23 acquires a correction value for a condition under which the amount of light fall off at edges is largest (the image quality deteriorates most), among conditions that can be set with the mounted lens unit 10. With a general lens unit, the level of light fall off at edges depends on the combination of the aperture value, the focal length and the focal position. In view of this, the correction value calculation circuit 23 extracts the lowest value of a standardized light amount regarding the combination of the aperture value, the focal length and the focal position with which the level of light fall off at edges is largest, based on the lens characteristics information held by the image capturing apparatus 100 or the lens unit 10. FIG. 6A shows an example of this lowest value. A characteristics curve indicating light fall off at edges at this time is defined as V(h) for an image height h. A correction value can be acquired as a reciprocal (1/V(h)) of V(h). Note that the lowest value of the standardized light amount or the correction value for a case thereof may be included in advance in the correction data acquired in step S401.

Figure 6B:
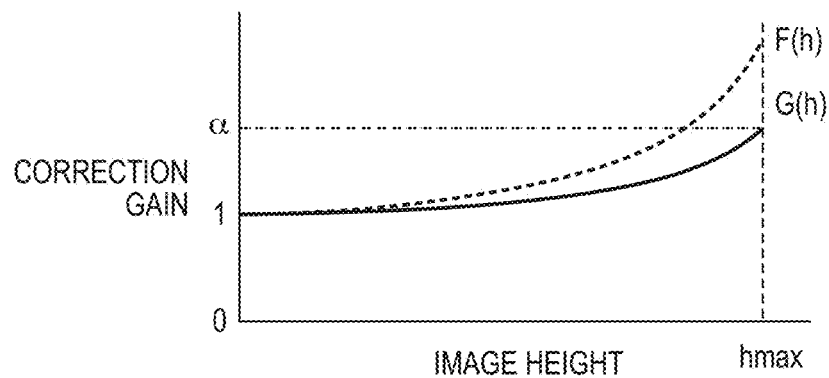

Next, in step S502, the correction value calculation circuit 23 calculates a correction value that is based on the maximum correction value under system restriction acquired in step S402. An example of this calculation method will be described with reference to FIG. 6B. Here, the allowable maximum gain that is the maximum correction value under system restriction is assumed to be α. In this case, for example, the correction value that is based on the allowable maximum gain can be calculated based on the expression below.

$$G(h) = \alpha(F(h)-1)/F(h\,\mathrm{max})+1 \qquad \text{Expression 1}$$

Here, F(h) is a function of an initial correction value for the image height h, and G(h) is a function of a correction value that takes system restriction into consideration and is to be acquired. In addition, hmax is the image height at which the maximum correction value is acquired.

Here, a correction result acquired by multiplying V(h) by G(h) of Expression 1 corresponds to a case where the characteristics of an image captured in a state with which the amount of light fall off at edges is largest out of states that the lens unit 10 can be in are corrected using the allowable maximum gain. At this time, correction remained to be made is largest, in other words, the difference between the correction result and the standardized light amount=1 is largest. In another state of the lens unit 10, at least the amount of light fall off at edges is smaller, and thus in the image capturing apparatus 100 in this embodiment, peripheral light amount in FIG. 6C that is defined by Expression 2 below can be achieved even if the image is captured in another state.

$$V'(h)=G(h)*V(h) \qquad \text{Expression 2}$$

In view of this, if peripheral light amount correction is performed using V'(h) as a target value, as long as the combination of the lens unit 10 and the image capturing apparatus 100 is the same, brightness at a periphery can be unified with any combination of an aperture value, a focal length and a focal position. Accordingly, the correction value calculation circuit 23 records V'(h) as the target value in step S503.

Here, returning to the flowchart in FIG. 4, after the target value is calculated in step S403, the correction value calculation circuit 23 starts moving image control in step S404. The reason for determining the target value first in this manner is that, if moving image control is started without determining a target, the brightness at the periphery becomes unstable at the time of starting moving image shooting. When moving image control is started in step S404, there is the possibility that the state of the lens unit 10 changes in real time due to AE control and a user operation. In view of this, in step S405, the correction value calculation circuit 23 acquires lens state information such as the aperture value, focal length and focal position of the lens unit 10 for each frame for peripheral light amount correction.

Next, in step S406, the correction value calculation circuit 23 calculates a correction value for application that is to be applied to peripheral light amount correction. First, the image characteristics value in the current frame is calculated from light fall off at edges characteristics that are based on the lens state information acquired in step S405. Next, the correction value calculation circuit 23 determines a correction value for application for the current frame using the calculated image characteristics value and the target value recorded in step S403. In the subsequent step S407, the correction value calculation circuit 23 outputs the correction value for application calculated in step S406 to the system control circuit 50. The system control circuit 50 provides the correction value for application to the image processing circuit 20, and the image processing circuit 20 corrects the current frame based on the correction value for application. After that, in step S408, the correction value calculation circuit 23 determines whether or not moving image shooting is to be ended based on an instruction from the system control circuit 50, and if it is determined that the shooting is not to be ended (NO in step S408), returns the procedure to step S405, and continues the processing. If it is determined that the shooting is to be ended (YES in step S408), this processing ends.

Figure 7A:
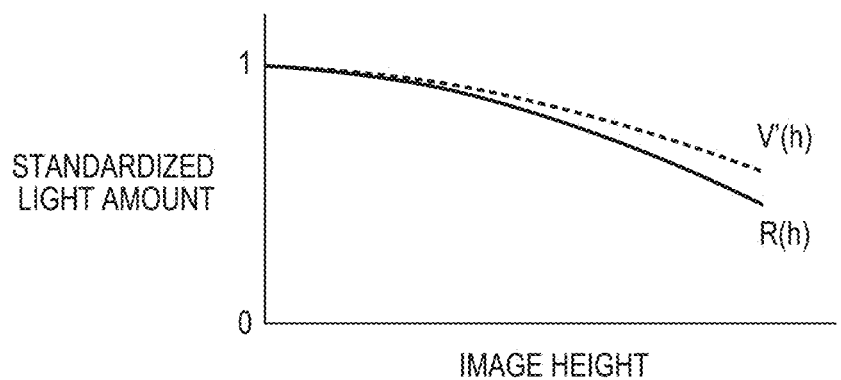
FIGS. 7A and 7B are diagrams for illustrating an example of a method for calculating a correction value according to the first embodiment of the invention.
Figure 7B:
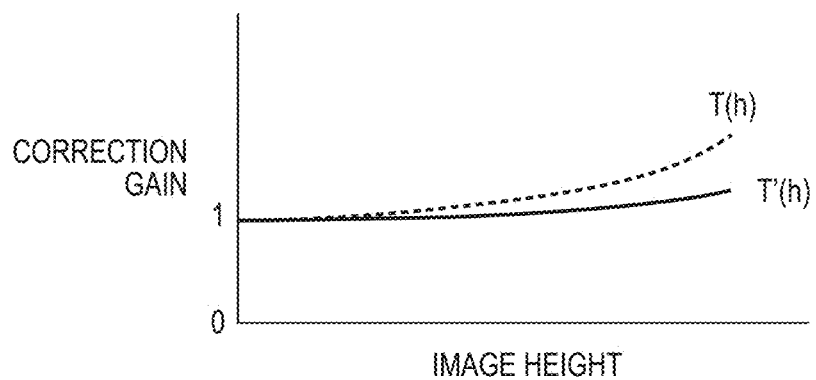

Processing for calculating a correction value for application in step S406 will be specifically described below with reference to FIGS. 7A and 7B. In FIG. 7A, V'(h) indicates an image characteristics value (light fall off at edges characteristics) corresponding to the target value calculated in step S403.

R(h) indicates an image characteristics value (light fall off at edges characteristics) of the current frame that is envisioned in the case where the lens unit 10 is in a state corresponding to the lens state information acquired in step S405. At this time, if a correction value T(h) in FIG. 7B calculated as a reciprocal of R(h) is applied to peripheral light amount correction in the current frame, there is a risk that the above-described quality degradation in the moving image occurs. In view of this, a correction value T'(h) with which the target value V'(h) that has been set in step S403 is acquired, and is defined by Expression 3 below is applied.

$$T'(h)=V'(h)/R(h) \qquad \text{Expression 3}$$

Figure 6C:
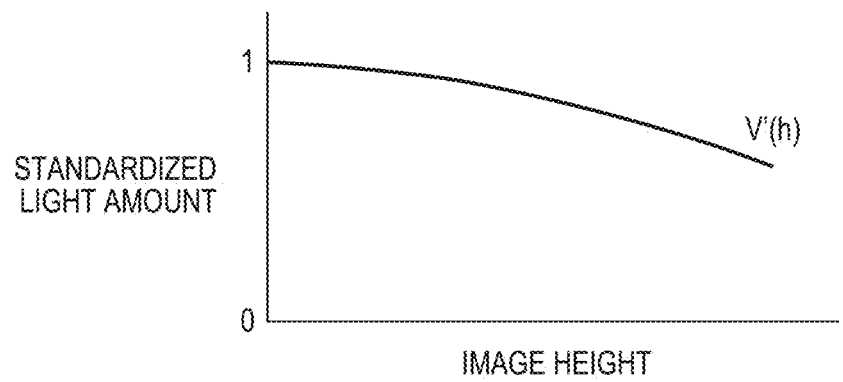

By providing T'(h) above, a frame image after peripheral light amount correction always has characteristics shown in FIG. 6C. Therefore, even if the state of the lens unit 10 changes in real time due to AE control and a user operation, flickering as a moving image can be suppressed to the maximum.

In the above description, a case where a correction value is calculated for each frame has been described, but if it is determined, based on the lens state information acquired in step S405, that an image characteristics value has not changed between frames by a predetermined level or more, processing for calculating a correction value may be skipped. In this case, it is possible to compare the current frame (the current image) to the immediately previous frame (the immediately previous image) processed immediately before the current frame in order to determine a change in the image characteristics. The image processing circuit 20 can then use the correction value used for peripheral light amount correction of the immediately previous image, for peripheral light amount correction of the current image.

It is possible to output a moving image that does not include flickering by continuing the above-described calculation of a correction value and peripheral light amount correction that is based on the calculated correction value until moving image shooting ends. In addition, it is possible to suppress flickering of the screen during live-view display by carrying out the above-described peripheral light amount correction while an LV function is being executed as well. In this manner, according to this embodiment, a correction image that is unlikely to give an unnatural feeling to the user can be acquired with regard to a change in the state of a lens unit.

Second Embodiment

A second embodiment of the invention will be described below with focus on a case where distortion aberration correction is performed. The configuration of an image capturing apparatus 100 in this embodiment is similar to that shown in the first embodiment, and thus detailed description thereof is omitted. In addition, also regarding other configurations, description of portions that overlap or correspond to those of the first embodiment is omitted, and portions unique to this embodiment will be described using the figures and reference signs of the first embodiment as necessary.

Regarding light fall off at edges discussed in the first embodiment, generally, the luminance of an image at a periphery does not exceed the luminance at the center. Therefore, in peripheral light amount correction, a correction value for an edge of the image (a region in which the image height is high) increases. On the other hand, in distortion aberration that will be discussed in this embodiment, compared to an ideal state (a state where shooting was performed with an aberration-free lens), the image quality deteriorates in two directions, namely, a state where the image is distorted inwardly (so-called barrel distortion) and a state where the image is distorted outwardly (so-called pincushion distortion). Accordingly, regarding distortion aberration, there is the possibility that the optical state of a lens unit 10 changes from one of the states of barrel distortion and pincushion distortion to the other state via an ideal state.

Figure 8:
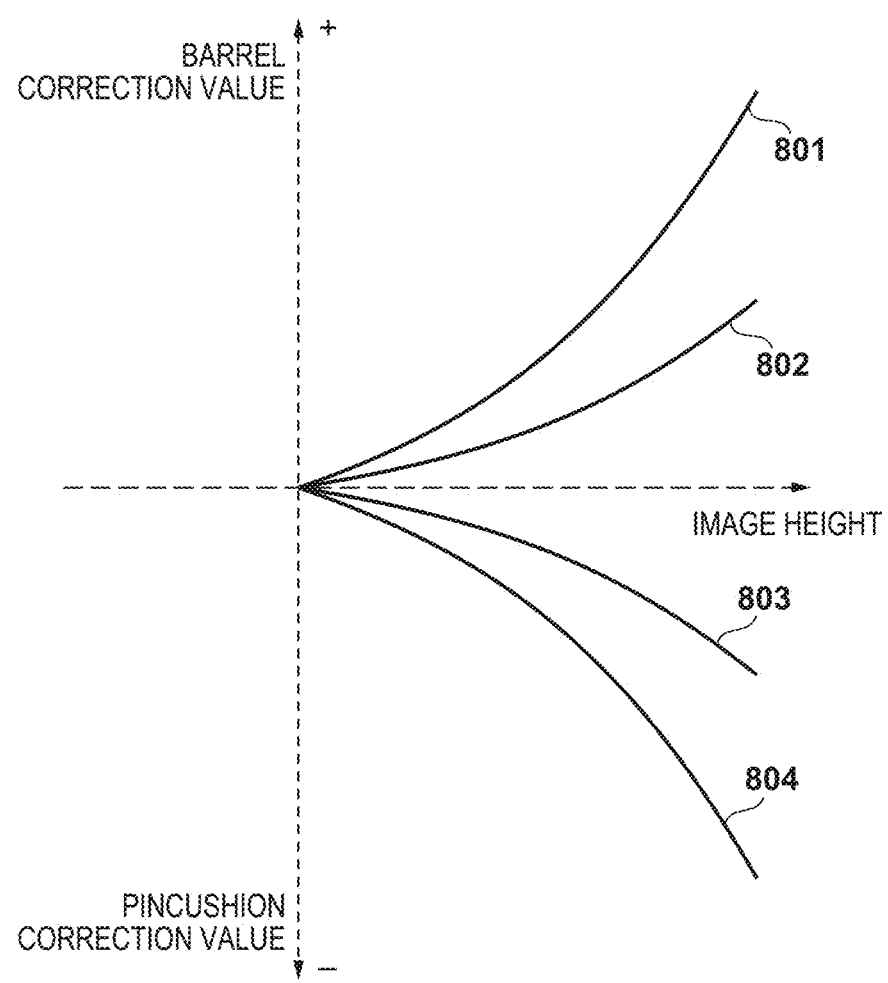
FIG. 8 is a graph showing examples of the relationship between the image height and the correction value for distortion aberration according to a second embodiment of the invention.

FIG. 8 is a graph showing examples of the relationship between the image height and the correction value for distortion aberration. In FIG. 8, the positive direction on the vertical axis indicates a correction value for barrel distortion aberration, and a higher numerical value indicates that barrel distortion aberration of a larger distortion amount has occurred. Conversely, the negative direction on the vertical axis indicates a correction value for pincushion distortion aberration, and a lower numerical value indicates that pincushion distortion aberration of a larger distortion amount has occurred.

Methods for correcting the above-described barrel distortion and pincushion distortion will be described with reference to FIGS. 9A to 9D and 10A to 10D, respectively.

Figure 9A:
FIGS. 9A to 9D are diagrams for illustrating the concept of barrel distortion aberration according to the second embodiment of the invention.
Figure 9B:
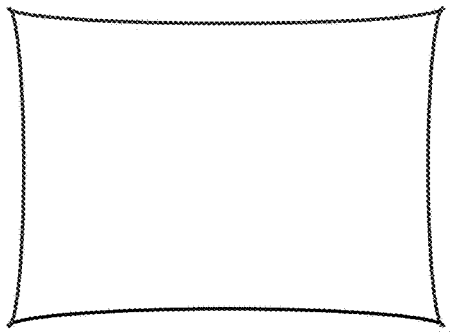
Figure 9C:
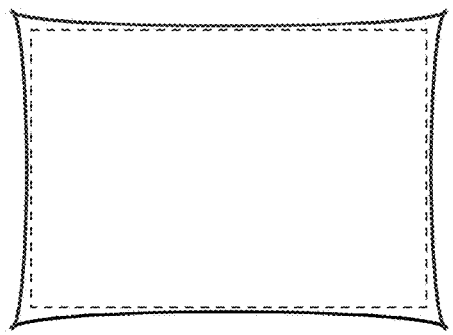
Figure 9D:

First, regarding FIGS. 9A to 9D, FIG. 9A shows an image before being corrected. This image is an image captured via the lens unit 10 and includes barrel distortion, and this image has been corrected using a barrel correction value 801 or 802 in the + direction shown in FIG. 8. When distortion correction is performed on the image in FIG. 9A, correction for cancelling a distortion component for each image height is applied, and enlarging processing using a different variable magnification ratio for each image height is performed. The image after the correction has a shape as in FIG. 9B. In the case of barrel distortion, correction on the + side is performed, and thus the number of pixels increases. If the center of the image after the correction is cropped based on the original size, the amount of loss of the angle of view becomes large, and in the case of an image capturing apparatus equipped with an optical finder, the loss from an angle of view that can be visually recognized with the optical finder becomes large. In view of this, as shown in FIG. 9C, a rectangle that is inscribed in the image after distortion conversion is set, and the image included in the rectangle region is uniformly reduced so as to be included in the original size. At last, as shown in FIG. 9D), the size of the image returns to the original size.

Figure 10A:
FIGS. 10A to 10D are diagrams for illustrating the concept of pincushion distortion aberration according to the second embodiment of the invention.
Figure 10B:
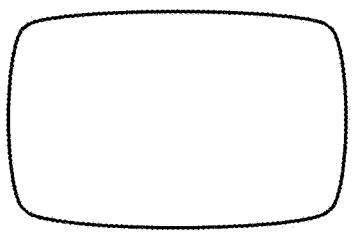
Figure 10C:
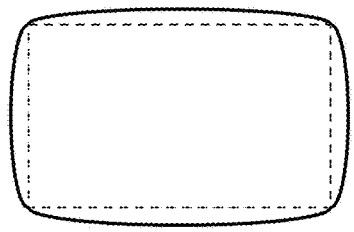
Figure 10D:
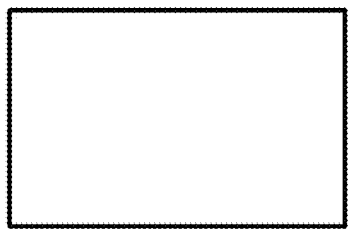

Next, correction of pincushion distortion aberration will be described with reference to FIGS. 10A to 10D. FIG. 10A shows an image before being corrected. This image is an image captured via the lens unit 10 and includes pincushion distortion, and this image has been corrected using a pincushion correction value 803 or 804 in the − direction shown in FIG. 8. When distortion correction is performed on the image in FIG. 10A, correction for cancelling a distortion component for each image height is applied, and reducing processing using a different variable magnification ratio for each image height is performed. The image after the correction has a shape as in FIG. 10B. In the case of pincushion distortion, correction on the − side is performed, and thus the number of pixels decreases, and the image is corrected so as to be reduced. Therefore, if the image is output without any change, the size of the image becomes smaller than the original image size, and an image that is incorrect at the periphery is output. In view of this, as shown in FIG. 10C, a rectangle that is inscribed in the image after distortion conversion is set similarly, and enlarging processing is performed such that the size of the image included in the rectangle region coincides with the original size. At last, as shown in FIG. 10D, the size of the image returns to the original size.

In the case of a still image, if pincushion aberration and barrel aberration are individually corrected, there is no problem. However, if, similarly to the case of peripheral light amount correction described in the first embodiment, correction as described above is applied to a moving image in which continuity in the time axis direction is important, the following problem occurs. As described above, reducing processing and enlarging processing are respectively applied to pincushion aberration and barrel aberration at last. Therefore, if the optical system shifts in a direction from pincushion to barrel or in the opposite direction thereto, the image magnification will change in the screen center that is hardly affected by distortion aberration in the first place.

An example of distortion aberration correction processing corresponding to this embodiment for solving this problem will be described below with reference to the flowchart in FIG. 4.

First, in step S401, similarly to the first embodiment, a correction value calculation circuit 23 acquires correction data of the lens unit 10 that is mounted. Next, in step S402, the correction value calculation circuit 23 acquires the maximum correction value for the system recorded in a non-volatile memory 56 in the image capturing apparatus 100. As described above, enlarging processing is performed after pincushion aberration correction in order to obtain a uniform pixel size for the final image. In reduction of pincushion aberration correction, reducing processing is not performed at the screen center, but in this enlarging processing after pincushion aberration correction, the entire image is enlarged, and thus the screen center will be enlarged. The enlargement rate at this time is maximum in a case where the correction value for pincushion aberration correction is maximum (the reduction rate is maximum). In view of this, in step S402, as the maximum correction value in distortion aberration correction, the maximum value of a pincushion aberration correction value is acquired. Here, in particular, the maximum value of the pincushion aberration correction value is extracted from all the states of distortion aberration that can be caused by the mounted lens unit 10.

Next, in step S403, the correction value calculation circuit 23 calculates, for an image as a correction result acquired by applying the maximum value of the pincushion aberration correction value acquired in step S402, an enlargement rate serving as a target value for setting the inscribed rectangle shown in FIG. 10C to a target image size. This enlargement rate is equivalent to a target value of the image magnification at the image height center portion in this lens unit 10. Note that a configuration may be adopted in which even in the case of distortion aberration correction, the enlargement rate serving as the target value is calculated in advance, and is included in the correction data acquired in step S401.

Next, after the enlargement rate serving as the target value is calculated in step S403, the correction value calculation circuit 23 starts moving image control in step S404. When moving image control is started, there is the possibility that the optical condition of the lens unit 10 changes due to an autofocus function and a user operation. In view of this, in step S405, the correction value calculation circuit 23 acquires lens state information such as the aperture value, the focal length and the focal position for each frame. Next, in step S406, a correction value for application that is applied to distortion aberration correction is calculated. First, the correction value calculation circuit 23 calculates a distortion correction value from distortion aberration characteristics that are based on the lens state information acquired in step S405. Here, determination of pincushion distortion or barrel distortion is not particularly performed, and a distortion correction value at the corresponding position is calculated based on the correction data. The correction value calculation circuit 23 then determines a correction value for application for the current frame based on the calculated distortion correction value and the target value calculated in step S403. In the subsequent step S407, the correction value calculation circuit 23 outputs the correction value for application calculated in step S406, to a system control circuit 50. The system control circuit 50 provides the correction value for application to an image processing circuit 20, and the image processing circuit 20 corrects the current frame based on the correction value for application. After that, in step S408, the correction value calculation circuit 23 determines, based on an instruction from the system control circuit 50, whether or not moving image shooting is to be ended, and if it is determined that the shooting is not to be ended (NO in step S408), the procedure returns to step S405, and the processing continues. If it is determined that the shooting is to be ended (YES in step S408), this processing is ended.

Figure 11:
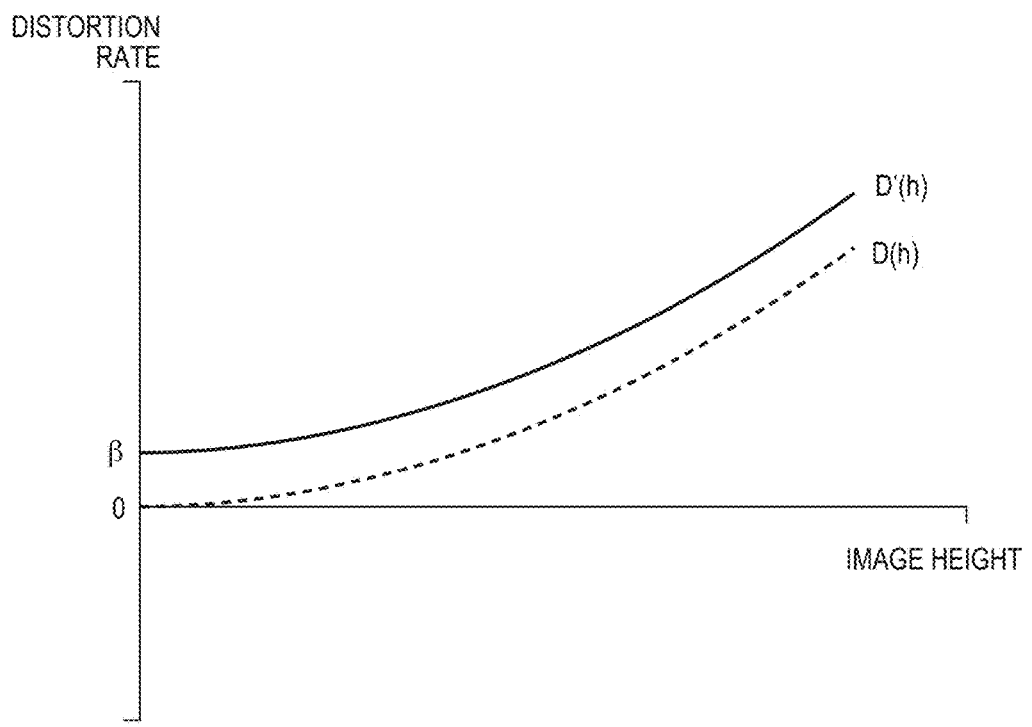
FIG. 11 is a diagram for illustrating an example of a method for calculating a correction value according to the second embodiment of the invention.

Processing for calculating a correction value for application in step S406, which corresponds to this embodiment, will be specifically described below with reference to FIG. 11. In FIG. 11, D(h) is a function of the distortion correction value calculated in step S406, and is indicated by a dotted line. Here, the correction value takes a value on the + side, and thus D(h) is a correction value for barrel distortion. In addition, β is the enlargement rate calculated in step S403. As shown in FIG. 11, the final correction value calculated in step S406 will be D'(h) defined by Expression 4 below.

$$D'(h)=β+D(h)$$ Expression 4

By adding the enlargement rate β to the correction value D(h) in this manner, β will be the initial value of the correction value for application. Accordingly, also in the case of barrel distortion, the enlargement rate calculated in step S403 is applied. As described with reference to FIGS. 9A to 9D, also in the case of barrel distortion, after the inscribed rectangle in FIG. 9C is set, reducing processing is performed so as to set the original image size, but the influence of the reducing processing at the last stage can be relatively reduced by setting the enlargement rate of the image center to β as in Expression 4 during distortion conversion, and performing enlarging processing in advance. Accordingly, even if the state of the mounted lens unit 10 changes, the image magnification at the screen center can be maintained substantially constant. In addition, by continuing the above-described calculation of a correction value and distortion aberration correction that is based on the calculated correction value until moving image shooting ends, it is possible to generate a moving image in which fluctuation of the image magnification is small.

In the description of the above embodiment, the value of β is determined in consideration of all the conditions of the lens unit 10, but if the focal length changes due to a zooming operation, the image magnification at the screen center changes, and thus the value of β may be calculated every time the focal length changes by a predetermined amount or more. Accordingly, the value of β can be made small, and deterioration in image quality and loss of angle of view due to enlarging processing can be suppressed to a minimum.

Note that in the description of the first and second embodiments, a configuration in which a correction image is generated within the image capturing apparatus 100 has been described as an example, but the invention is not limited thereto. The invention can be applied even in the case where a moving image shot by the image capturing apparatus 100 is transferred to an image processing apparatus such as an external PC or a server, and this image processing apparatus performs correction processing for reducing light fall off at edges and distortion aberration.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system, or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-240565, filed on Dec. 12, 2016, which is hereby incorporated by reference herein in its entirety.

What is claimed is:

1. An image processing apparatus comprising:
a circuitry configured to perform operations of:
obtaining an image generated by an image sensor by photoelectrically converting an optical image of a subject that has passed through an optical member, wherein the image has degradation in image quality caused by an optical member, and a degree of degradation changes in accordance with a state of the optical member;
setting first correction values for correcting the degradation in image quality caused by the optical member, in accordance with the state of the optical member when the image is generated;
calculating second correction values based on (i) a correction value for correcting the largest degradation in image quality of the degradation in image quality caused by the optical member which changes in accordance with the state of the optical member, (ii) a predetermined upper limit value, and (iii) the first correction values; and
correcting the image based on the second correction values.

2. The image processing apparatus according to claim 1, wherein the degradation in image quality caused by the optical member is light fall off at edges, and a correction gain at each image height of the image is given as one of the first correction values.

3. The image processing apparatus according to claim 1, wherein the first correction values change in accordance with image height, and the second correction values are calculated based on (i) a function based on the correction value for correcting the largest degradation in image quality and the predetermined upper limit value, and (ii) the first correction values.

4. The image processing apparatus according to claim 3, wherein the degradation in image quality caused by the optical member is light fall off at edges, and a correction gain at each image height of the image is given as one of the first correction values.

5. The image processing apparatus according to claim 4, wherein the circuitry is further configured to perform operations of:

calculating the first correction values as values for causing a light amount value at each image height to match a predetermined value, and setting the first correction values.

6. The image processing apparatus according to claim 1, wherein the state of the optical member includes at least states regarding an aperture, a focal length, and a focal position.

7. The image processing apparatus according to claim 1, wherein the circuitry is further configured to perform operations of:

if it is determined that a degree of the degradation in image quality of the image caused by the optical member has not changed by a predetermined level or more between a current image generated by the image sensor and an immediately previous image generated immediately before the current image, correcting the current image based on the second correction values that were set for the immediately previous image.

8. The image processing apparatus according to claim 1, wherein the circuitry is further configured to perform operations of determining the upper limit value before the image sensor starts generating the image.

9. An image processing apparatus comprising:
a circuitry configured to perform operations of:
obtaining a first image generated by an image sensor by photoelectrically converting an optical image of a subject that has passed through an optical member, wherein the first image has distortion caused by the optical member and a degree of distortion changes in accordance with a state of the optical member;

setting first correction values for correcting the distortion in accordance with the state of the optical member when the first image is generated;

setting second correction values based on (i) a variable magnification ratio having the maximum enlargement amount of variable magnification ratios for magnifying the second image obtained by image processing for correcting the distortion to have a predetermined size, and (ii) the first correction values; and correcting the image based on the second correction values.

10. The image processing apparatus according to claim 9, wherein the distortion caused by the optical member is distortion aberration, and a variable magnification ratio at each image height of the image is given as one of the first correction values.

11. The image processing apparatus according to claim 9, wherein the state of the optical member includes at least a state regarding an aperture, a focal length, and a focal position, and the circuitry is further configured to perform operations of obtaining the variable magnification ratio having the maximum enlargement amount again when the state regarding the focal length changes by a predetermined amount or more.

12. The image processing apparatus according to claim 9, wherein the second correction values are obtained by adding the variable magnification ratio having the maximum enlargement amount to the first correction values.

13. The image processing apparatus according to claim 12, wherein the distortion caused by the optical member is distortion aberration, and a variable magnification ratio at each image height of the image is given as one of the first correction values.

14. The image processing apparatus according to claim 13, wherein the variable magnification ratio having the maximum enlargement amount is a variable magnification ratio when a degree of a pincushion distortion caused by the optical member is the maximum.

15. An image capturing apparatus comprising:
an image sensor that generates an image by photoelectrically converting an optical image of a subject that has passed through an optical member; and
a circuitry configured to perform operations of:
obtaining the image generated by the image sensor, wherein the image has degradation in image quality caused by the optical member, and a degree of degradation changes in accordance with a state of the optical member;

setting first correction values for correcting the degradation in image quality of the image caused by the optical member, in accordance with the state of the optical member when the image is generated;

calculating second correction values based on (i) a correction value for correcting the largest degradation in image quality of the degradation in image quality caused by the optical member which changes in accordance with the state of the optical member, (ii) a predetermined upper limit value, and (iii) the first correction values;

correcting the image based on the second correction values.

16. A method for controlling an image processing apparatus, comprising:
obtaining an image generated by an image sensor by photoelectrically converting an optical image of a subject that has passed through an optical member, wherein the image has degradation in image quality caused by an optical member, and a degree of degradation changes in accordance with a state of the optical member;

setting first correction values for correcting the degradation in image quality of the image caused by the optical member, in accordance with the state of the optical member when the image is generated;

calculating second correction values based on (i) a correction value for correcting the largest degradation in image quality of the degradation in image quality caused by the optical member which changes in accordance with the state of the optical member, (ii) a predetermined upper limit value, and (iii) the first correction values; and correcting the image based on the second correction values.

17. A non-transitory computer-readable storage medium storing a program that, when executed by a processor of an image processing apparatus causes the processor to perform a method, the method comprising:

obtaining an image generated by an image sensor by photoelectrically converting an optical image of a subject that has passed through an optical member, wherein the image has caused by an optical member, and a degree of degradation changes in accordance with a state of the optical member;

setting first correction values for correcting the degradation in image quality of the image caused by the optical member, in accordance with the state of the optical member when the image is generated;

calculating second correction values based on (i) a correction value for correcting the largest degradation in image quality of the degradation in image quality caused by the optical member which changes in accordance with the state of the optical member, (ii) a predetermined upper limit value, and (iii) the first correction values; and correcting the image based on the second correction values.

18. An image capturing apparatus comprising:

an image sensor that generates an image by photoelectrically converting an optical image of a subject that has passed through an optical member; and a circuitry configured to perform operations of:

obtaining a first image generated by the image sensor, wherein the first image has distortion caused by the optical member and a degree of distortion changes in accordance with a state of the optical member;

setting first correction values for correcting the distortion in accordance with the state of the optical member when the first image is generated;

setting second correction values based on (i) a variable magnification ratio having the maximum enlargement amount of variable magnification ratios for magnifying the second image obtained by image processing for correcting the distortion to have a predetermined size, and (ii) the first correction values; and correcting the image based on the second correction values.

19. A method for controlling an image processing apparatus, comprising:

obtaining a first image generated by an image sensor by photoelectrically converting an optical image of a subject that has passed through an optical member, wherein the first image has distortion caused by the optical member and a degree of distortion changes in accordance with a state of the optical member;

setting first correction values for correcting the distortion in accordance with the state of the optical member when the first image is generated;

setting second correction values based on (i) a variable magnification ratio having the maximum enlargement amount of variable magnification ratios for magnifying the second image obtained by image processing for correcting the distortion to have a predetermined size, and (ii) the first correction values; and correcting the image based on the second correction values.

20. A non-transitory computer-readable storage medium storing a program that, when executed by a processor of an image processing apparatus causes the processor to perform a method, the method comprising:

obtaining a first image generated by an image sensor by photoelectrically converting an optical image of a subject that has passed through an optical member, wherein the first image has distortion caused by the optical member and a degree of distortion changes in accordance with a state of the optical member;

setting first correction values for correcting the distortion in accordance with the state of the optical member when the first image is generated;

setting second correction values based on (i) a variable magnification ratio having the maximum enlargement amount of variable magnification ratios for magnifying the second image obtained by image processing for correcting the distortion to have a predetermined size, and (ii) the first correction values;

correcting the image based on the second correction values.

* * * * *